United States Patent
Abe

(10) Patent No.: US 6,584,237 B1
(45) Date of Patent: Jun. 24, 2003

(54) METHOD AND APPARATUS FOR EXPANDING IMAGE DATA

(75) Inventor: Nobuaki Abe, Hokkaido (JP)

(73) Assignee: Pentax Corporation, Tokyo (JP)

( * ) Notice: Subject to any disclaimer, the term of this patent is extended or adjusted under 35 U.S.C. 154(b) by 365 days.

(21) Appl. No.: 09/642,813

(22) Filed: Aug. 22, 2000

(30) Foreign Application Priority Data

Aug. 23, 1999 (JP) .......................................... 11-235960

(51) Int. Cl.[7] .............................. G06K 9/32; G06K 9/36; H04N 5/44; H04N 1/46; H04N 9/74
(52) U.S. Cl. ........................ 382/299; 382/233; 382/184; 382/287; 382/295; 382/298; 382/300; 348/561; 348/581; 348/704; 345/660; 345/671; 345/672; 345/677; 358/451; 358/525
(58) Field of Search ................................ 382/184, 233, 382/287, 295, 296, 297, 298, 299, 300; 345/648, 659, 660, 671, 672, 677; 348/449, 561, 581, 583, 704; 358/428, 451, 488, 525; 708/203, 208, 290; 250/557

(56) References Cited

U.S. PATENT DOCUMENTS

| | | | | |
|---|---|---|---|---|
| 4,952,923 A | * | 8/1990 | Tamura ...................... | 382/233 |
| 5,159,648 A | * | 10/1992 | Ogura et al. ................ | 382/233 |
| 5,572,605 A | * | 11/1996 | Toraichi ...................... | 382/241 |
| 5,737,456 A | * | 4/1998 | Carrington et al. ......... | 382/299 |
| 6,104,841 A | * | 8/2000 | Tojo et al. ................... | 382/299 |
| 6,473,558 B1 | * | 10/2002 | Wu et al. ..................... | 386/68 |

FOREIGN PATENT DOCUMENTS

WO   99/64987   12/1999

OTHER PUBLICATIONS

Kazuo Toraichi, "Wavelets, Fractals, and Chaos from Fluency Analysis", SURI–KAGAKU No. 363, pp. 8–12.

Kazuo Toraichi, "Wisdom Systems Based on Fluency Analysis", Toyota Research Report No. 48, pp. 39–45 (May, 1995).

Kazuo Toraichi et al., "A General Formula for the Wavelets in Fluency Approach", IEICE Trans. Fundamentals, vol. E77-A, No. 5, pp. 818–824 (May 1994).

Kazuo Toraichi et al., "A Series of Discrete–Time Models of a Continuous–Time System Based on Fluency Signal Approximation", Int. J. Systems Sci., vol. 26, No. 4, pp. 871–881 (1995).

K. Toraichi et al., "A Series of Discrete–Time Models of a Continuous–Time System Based on Fluency Signal Approximation", IEEE Pac. Rim, pp. 493–496 (1993).

An English Translation of WO99/64987.

* cited by examiner

*Primary Examiner*—Phuoc Tran
*Assistant Examiner*—Amir Alavi
(74) *Attorney, Agent, or Firm*—Greenblum & Bernstein, P.L.C.

(57) ABSTRACT

An expanded-image generating apparatus is provided for original image data, in which a plurality of pixels is arranged in a matrix, so as to obtain expanded-image data partitioned into a plurality of blocks, each of which is composed of a plurality of pixels When the magnifying power regarding at least one of a direction along width and a direction along length in the original image data is set, a pixel arranging processor arranges each pixel in the original image data at a position corresponding to a center position of each of the plurality of blocks in accordance with the magnifying power. The expanded-image data corresponding to the magnifying power is generated at pixel generating positions corresponding to the each block by applying a fluency transform to each pixel in the original image data at the position. When the magnifying power is odd numbered, a shifting processor shifts said pixel generating positions relative to each corresponding pixel of said original image data by a shifting-amount corresponding to said magnifying power such that each arranged pixel of said original image data is off-center with respect to said plurality of blocks.

9 Claims, 17 Drawing Sheets

FIG. 7

| m / PIXEL VALUES | 1 | 2 | 3 |
|---|---|---|---|
| 10 | $R_{ts}$ | $(9R_{ts}+7P_{ts-1})/16$ | $(681R_{ts}+469P_{ts-1}-77P_{ts+1}-49P_{ts-2})/1024$ |
| 11 | $R_{ts}$ | $(11R_{ts}+5P_{ts-1})/16$ | $(849R_{ts}+285P_{ts-1}-85P_{ts+1}-25P_{ts-2})/1024$ |
| 12 | $R_{ts}$ | $(13R_{ts}+3P_{ts-1})/16$ | $(961R_{ts}+141P_{ts-1}-69P_{ts+1}-9P_{ts-2})/1024$ |
| 13 | $R_{ts}$ | $(15R_{ts}+P_{ts-1})/16$ | $(1017R_{ts}+37P_{ts-1}-29P_{ts+1}-P_{ts-2})/1024$ |
| 14 | $R_{ts}$ | $(15R_{ts}+P_{ts+1})/16$ | $(1017R_{ts}-29P_{ts-1}+37P_{ts+1}-P_{ts+2})/1024$ |
| 15 | $R_{ts}$ | $(13R_{ts}+3P_{ts+1})/16$ | $(961R_{ts}-69P_{ts-1}+141P_{ts+1}-9P_{ts+2})/1024$ |
| 16 | $R_{ts}$ | $(11R_{ts}+5P_{ts+1})/16$ | $(849R_{ts}-85P_{ts-1}+285P_{ts+1}-25P_{ts+2})/1024$ |
| 17 | $R_{ts}$ | $(9R_{ts}+7P_{ts+1})/16$ | $(681R_{ts}-77P_{ts-1}+469P_{ts+1}-49P_{ts+2})/1024$ |

| $I'_{x'7}$ \ m | 1 | 2 | 3 |
|---|---|---|---|
| $I'_{07}$ | I7 | (9I7+7g7)/16 | (681I7+469g7−77h7−49I7)/1024 |
| $I'_{17}$ | I7 | (11I7+5g7)/16 | (849I7+285g7−85h7−25I7)/1024 |
| $I'_{27}$ | I7 | (13I7+3g7)/16 | (961I7+141g7−69h7−9f7)/1024 |
| $I'_{37}$ | I7 | (15I7+g7)/16 | (1017I7+37g7−29h7−f7)/1024 |
| $I'_{47}$ | I7 | (15I7+h7)/16 | (1017I7−29g7+37h7−k7)/1024 |
| $I'_{57}$ | I7 | (13I7+3h7)/16 | (961I7−69g7+141h7−9k7)/1024 |
| $I'_{67}$ | I7 | (11I7+5h7)/16 | (849I7−85g7+285h7−25k7)/1024 |
| $I'_{77}$ | I7 | (9I7+7h7)/16 | (681I7−77g7+469h7−49k7)/1024 |

| PIXEL VALUES m | 1 | 2 | 3 |
|---|---|---|---|
| 10 | $P_{ts}$ | $(P_{ts}+2P_{ts-1})/3$ | $(29P_{ts}+11P_{ts-1}-3P_{ts+1}-P_{ts-2})/36$ |
| 11 | $P_{ts}$ | $P_{ts}$ | $P_{ts}$ |
| 12 | $P_{ts}$ | $(P_{ts}+2P_{ts+1})/3$ | $(29P_{ts}-3P_{ts-1}+11P_{ts+1}-P_{ts+2})/36$ |

| PIXEL VALUES \ m | 1 | 2 | 3 |
|---|---|---|---|
| I0 | $P_{ts}$ | $(5P_{ts}+P_{ts-1})/6$ | $(137P_{ts}+17P_{ts-1}-9P_{ts+1}-P_{ts-2})/144$ |
| I1 | $P_{ts}$ | $(5P_{ts}+P_{ts+1})/6$ | $(137P_{ts}-9P_{ts-1}+17P_{ts+1}-P_{ts+2})/144$ |
| I2 | $P_{ts}$ | $(P_{ts}+P_{ts+1})/2$ | $(9P_{ts}-P_{ts-1}+9P_{ts+1}-P_{ts+2})/16$ |

T4

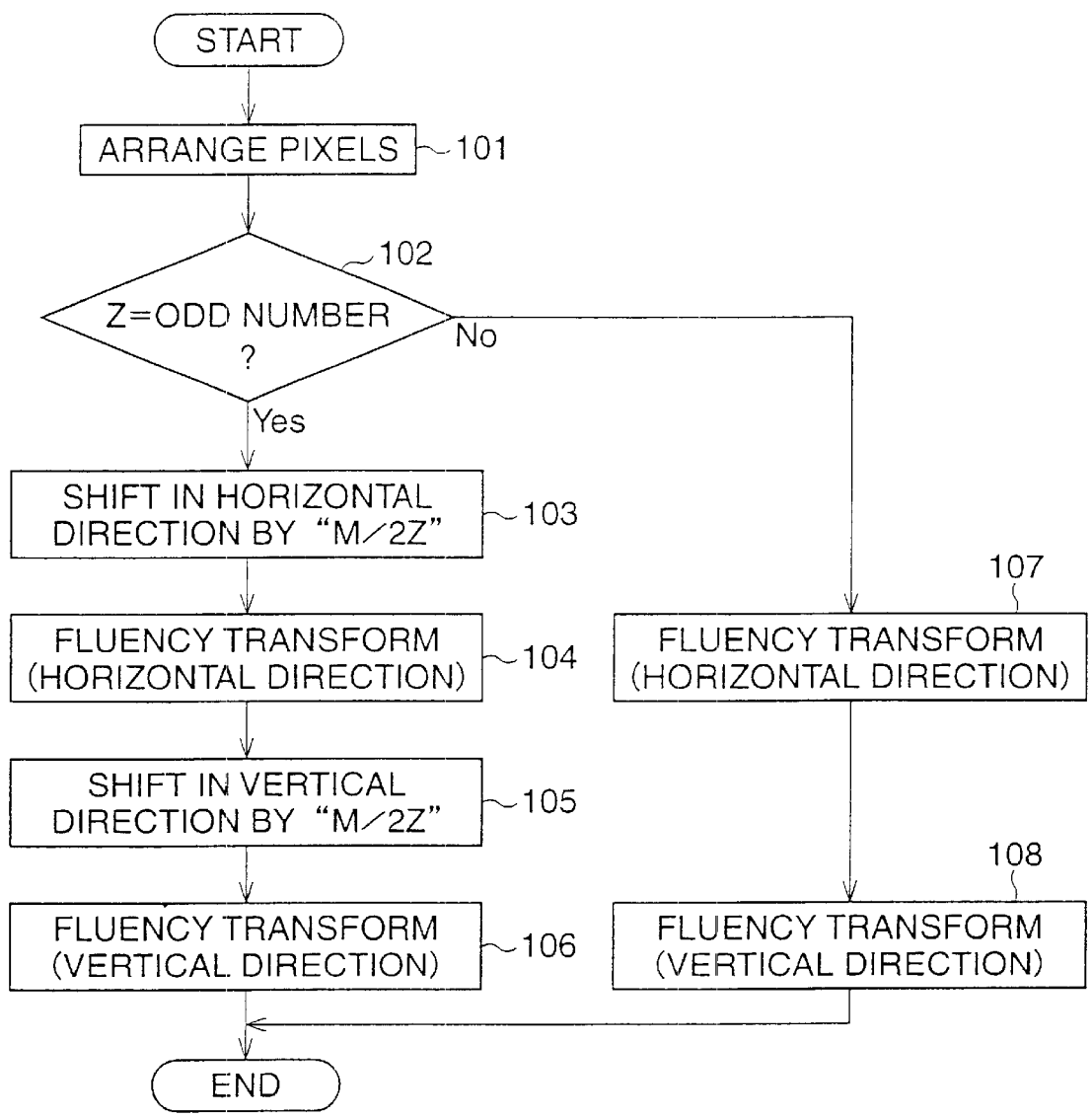

METHOD AND APPARATUS FOR EXPANDING IMAGE DATA

BACKGROUND OF THE INVENTION

1. Field of the Invention

The present invention relates to a method and apparatus for expanding original image data to obtain expanded-image data composed of larger number of pixels than that of the original image data.

2. Description of the Related Art

Conventionally, when expanding original image data to obtain expanded-image data composed of a larger number of pixels than that of the original image data, an interpolation processing, such as a linear interpolation, is executed. Thus, pixels are interpolated so that the expanded-image is generated. By performing the interpolation processing, a size of a digital image displayed on a display unit can be changed as required.

However, when performing the conventional interpolation processing including the linear interpolation, a variation of pixel value between pixels is not smooth, and the expanded-image data with a high-resolution can not be obtained. Namely, picture quality decreases in the process of expansion.

SUMMARY OF THE INVENTION

Therefore, an object of a present invention is to provide a method and apparatus for expanding original image data, while limiting the degradation of picture quality. An apparatus for expanding original image data according to the present invention expands the original image data. The original image data is arranged in a matrix and is composed of a determined number of pixels. The expanded-image data is partitioned into a plurality of blocks composed of a plurality of pixels. The apparatus has a magnifying power setting processor, a pixel arranger, a shifting processor, a magnifying power inspector and an expanded-image generating processor. The magnifying power setting processor sets a magnifying power regarding at least of a width direction and a length direction in the original image data. The pixel arranger arranges each pixel in said original image data at a position corresponding to a center position of each of said plurality of blocks in accordance with said magnifying power. The expanded-image generating processor generates the expanded-image data corresponding to the magnifying power by applying a fluency transform to each pixel in the original image data. Thus, the plurality of pixels in each block is generated at pixel generating positions. The magnifying power inspector inspects whether the magnifying power is odd numbered. Then, when the magnifying power is the odd numbered, the shifting processor relatively shifts the pixel generating positions with respect to each corresponding pixel of original image data by a shifting-amount, corresponding to the magnifying power, such that each arranged pixel of original image data is off-center with respect to the plurality of blocks. As the fluency transform is executed, the variation of pixel value between pixels becomes smooth, and the picture quality is maintained in the process of expansion processing. Further, the fluency transform is executed after the shifting process is performed when the magnifying power is odd numbered, so that the variation of pixel value between pixels becomes smooth.

BRIEF DESCRIPTION OF THE DRAWINGS

The present invention will be better understood from the description of the preferred embodiment of the invention set forth below together with the accompanying drawings, in which:

FIG. 7 is a view showing a table T1 indicating 8 pixel values along the horizontal direction in a block.

FIG. 9 is a view showing a table T2 representing 8 pixel values along the vertical direction in the block.

FIG. 11 is a view showing a table T3 representing 3 pixel values along the vertical direction in the block.

FIG. 15 is a view showing a table T4 representing pixel values obtained by shift processing.

FIG. 17 is a view showing a flowchart of the process for obtaining the expanded-image data.

DESCRIPTION OF THE PREFERRED EMBODIMENTS

Hereinafter, the preferred embodiment of the present invention is described with reference to the attached drawings.

Figure 1:
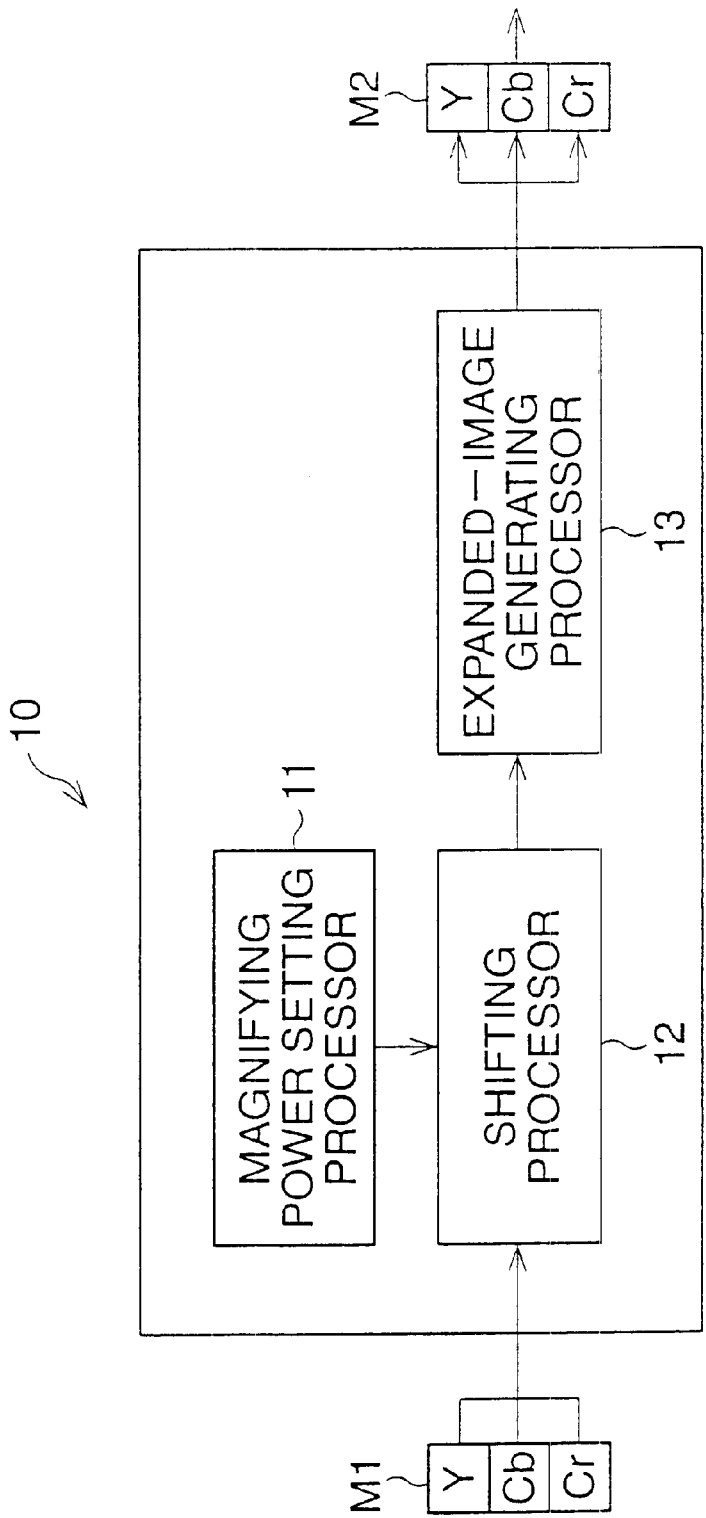
FIG. 1 is a block diagram of an expanded-image generating apparatus of an embodiment.

FIG. 1 is a block diagram of an expanded-image generating apparatus of an embodiment of the present invention.

In a memory M1, original image data composed of luminance data Y and color difference data Cb, Cr is stored. In this embodiment, the original image data is obtained by being photographed by a digital still camera. The original image data is composed of a plurality of pixels, and the plurality of pixels are arranged in a matrix. The luminance data Y and color difference data Cb, Cr corresponding to one frame worth of the original image data are stored in an independent area of the memory M1, respectively. The luminance data Y and color difference data Cb, Cr are fed to an expanded-image generating apparatus 10, and are subjected to an expansion processing, separately.

The expanded-image generating apparatus 10 has a magnifying power setting processor 11, a shifting processor 12 and an expanded-image generating processor 13. Note that, a CPU (not shown) controls the expanded-image generating apparatus as a whole, and an input device (not shown) for selecting a magnifying power is provided. When the input device is operated, the magnifying power is set in the magnifying power setting processor 11. Note that, the magnifying power is an integer number.

In the shifting processor 12, an arrangement of each pixel in the original image data is performed in accordance with a value of the magnifying power. Further, in the shifting processor 12, a shift processing regarding a pixel position of arranged pixels of the original image data is executed when the magnifying power is odd numbered, on the other hand, the shift processing is not executed when the magnifying power is even numbered.

In the expanded-image generating processor 13, the fluency transform is executed to each pixel in the original image data, so that expanded-image data, which has a larger number of pixels than that of the original image data, is obtained. The expanded-image data is fed to a memory M2. The luminance data Y and color difference data Cb, Cr corresponding to one frame worth of the expanded-image data are fed to a display device (not shown), thus the expanded-image is displayed on the display device.

Figure 2:
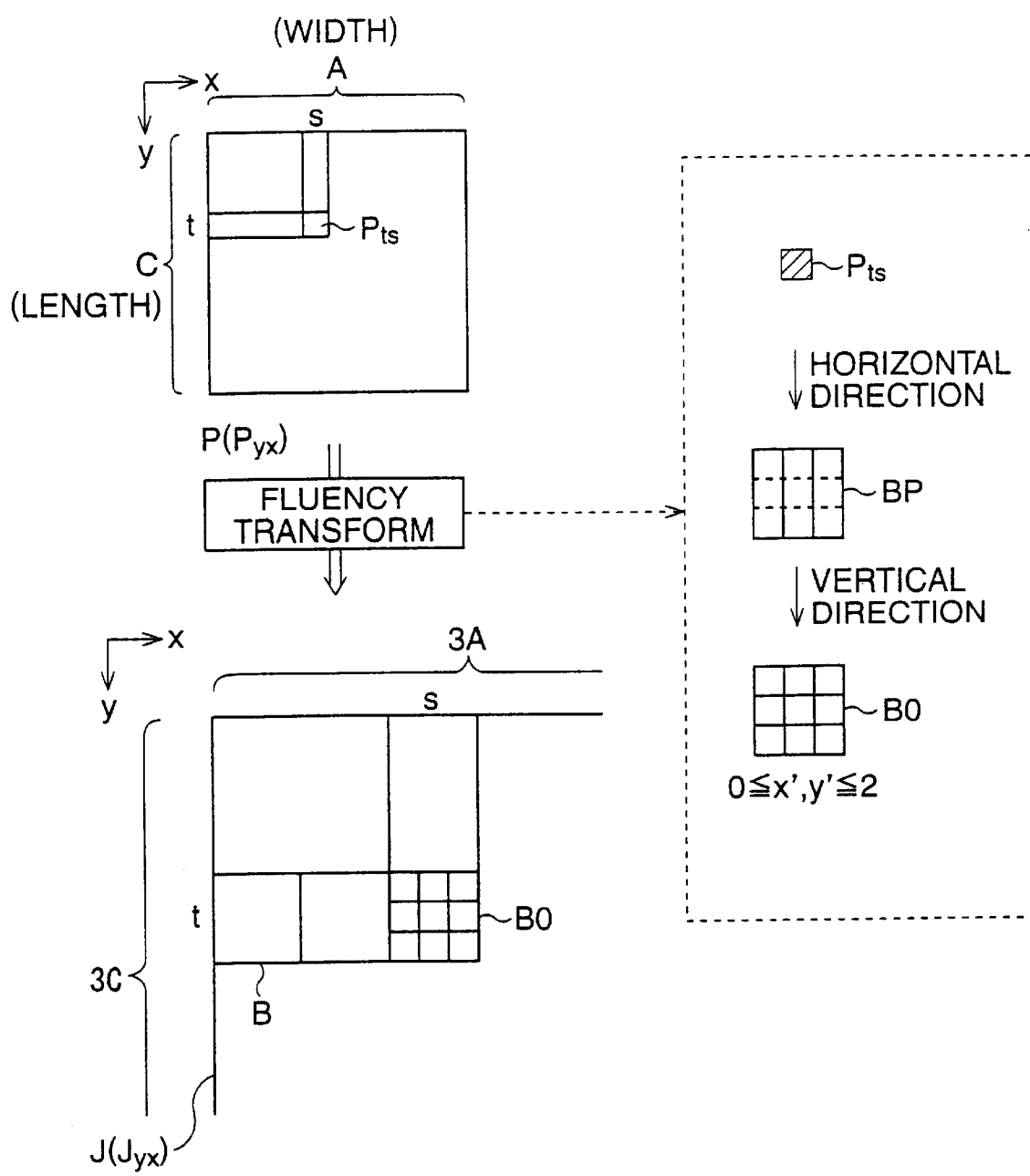
FIG. 2 is a view showing an expansion processing.

FIG. 2 is a view showing an expansion processing.

The original image data P is composed of "A×C" pixels, "A" pixels are arranged along a horizontal direction and "C" pixels are arranged along a vertical direction. A range of values of each pixel $P_{yx}$ is 0 to 255. Note that, hereinafter, pixel values are also represented by "$P_{yx}$". As shown in FIG. 2, x-y coordinates are defined with respect to the original image data P. A top-left corner of the original image data P is set to an origin, an x-axis is parallel to the horizontal direction and a y-axis is parallel to the vertical direction. A pixel $P_{ts}$ shown in FIG. 2 is positioned at the s-th pixel along the x-axis and the t-th pixel along the y-axis.

Each pixel in the original image data P is subject to the fluency transform along the horizontal (x-axis) and vertical (y-axis) direction, in accordance with the magnifying power. For example, the pixel $P_{ts}$ is subject to the fluency transform along the horizontal direction, thus block BP composed of 3 pixels along the horizontal direction is generated. Then, the fluency transform along the vertical direction is executed to the 3 pixels obtained by the fluency transform along the horizontal direction, thus a block B0 composed of 3×3 (=9) pixels is generated. A size of the pixel $J_{yx}$ is equal to that of the pixel $P_{yx}$.

When all pixels in the original image data P are subjected to the fluency transform, the expanded-image data J partitioned into a plurality of blocks B including the block B0, each of which is composed of 3×3 pixels, is generated. A position of the block B0 in the expanded-image data J corresponds to a position of the pixel $P_{ts}$ in the original image data P, therefore, the block B0 is positioned at the s-th block along the horizontal direction and the t-th block along the vertical direction. In this way, the position of each of the blocks B in the expanded-image data J corresponds to the position of the corresponding pixel $P_{yx}$ in the original image data P.

To indicate a position of a pixel in the block B0, an x'-axis and a y'-axis are defined with respect to the horizontal direction and the vertical direction respectively, and each pixel in the original image data P is represented by "$I'_{y'x'}$". The pixel $J_{yx}$ in the expanded-image data J and the pixel "$I'_{y'x'}$" satisfy the following formula.

$$J_{yx} = J_{t\times 3 + y', s\times 3 + x'} = I'_{y'x'} \quad (1)$$

Each block B is a square block, and a pixel number along the x'-axis and the y'-axis are both of "3". Therefore, a pixel number along the horizontal (width) direction and the vertical (length) direction in the original image data P are "3A" and "3C" respectively, and the pixel number of the expanded-image data J is "9×A×C".

In this way, the original image data P composed of "A×C" pixels is transformed to the expanded-image data J composed of "3A×3C" pixels by the fluency transform. Note that, in this embodiment, the magnifying power means a ratio of the pixel number along the horizontal/vertical direction in the original image data P to the pixel number along the horizontal/vertical direction in the expanded-image data J. Therefore, a size of the expanded-image data J to a size of the original image data P is the square of the magnifying power. For example, in FIG. 2, the magnifying power is "3" and the expanded-image data has a size of 9 times of the original image data P.

Hereinafter, with reference to FIGS. 3 to 9, the fluency transform is explained. Since the fluency transform is based on a fluency function, the fluency function will be described before the explanation of the fluency transform.

The fluency function, named by professors Kamada and Toraichi, is known as a function, which represents various signals appropriately, for example, disclosed in a Mathematical Physics Journal (SURI-KAGAIU) No.363, pp8–12 (1993), published in Japan. To begin with, a fluency function space is defined as follows.

It is supposed that a function space composed of a staircase (scaling) function, which is obtained on the basis of a rectangular function represented by formula (2), is represented as shown in following formula (3), the fluency function space is defined by formula (4).

$$\chi(t) = \begin{cases} 1, & |t| \leq 1/2 \\ 0, & \text{otherwise} \end{cases} \quad (2)$$

$$^1S := \left\{ f : R \to C \,\middle|\, f(t) = \sum_{n=-\infty}^{\infty} b_n \chi(t-n), \ \{b_n\} \in l^2 \right\} \quad (3)$$

$$^mS := \quad (4)$$

$$\left\{ h : R \to C \,\middle|\, h(t) = \int_{-\infty}^{\infty} f(t-\tau) g(\tau) d\tau, \ f \in {}^{m-1}S, \ g \in {}^1S \right\} (m \geq 2)$$

The fluency function space of order m "$^mS$" is constructed by a function system, composed of an (m−2)-times continuously differentiable piecewise polynomial of degree m−1. The fluency function is a staircase (scaling) function when m is 1. The formula (2), which represents rectangular function, indicates a sampling basis at order m=1, and the formula (3) indicates the fluency function space at order m=1. The fluency function space $^mS$ is a series of a function space, which can connect from a staircase function space (m=1) to a Fourier band-limited function space (m=∞) Note that, a continuous differentiability m is regarded as a parameter.

The function system, characterizing the fluency function space $^mS$ and corresponding to an impulse response, is derived from a biorthogonal sampling basis theorem composed of a pair of a sampling basis and its biorthogonal basis. In this theorem, an arbitrary function $f \in {}^mS$ satisfies following formulae (5), (6) for a sampling value $f_n = f(n)$ $$f(t) = \sum_{n=-\infty}^{\infty} f_{n[^mS]} \phi(t-n) \quad (5)$$

$$f_n = \int_{-\infty}^{\infty} f(t) \overline{{}_{[^mS^*]}\phi(t-n)} dt \quad (6)$$

where $_{[^{m}S]}\phi \in {}^{m}S$ satisfying $$_{[^{m}S]}\phi \in {}^{m}S = (1/2\pi)\int_{-\infty}^{\infty}\left\{\sum_{q=-\infty}^{\infty}[(-1)^{q}(1-q(2\pi/\omega))]^{m}\right\}^{-1} \times \exp(i\omega t)d\omega$$

on the other hand, $_{[^{m}S^{n}]}\phi \in {}^{m}S$ satisfying $$\int_{-\infty}^{\infty}{}_{[^{m}S]}\phi(t-n)\overline{{}_{[^{m}S^{*}]}\phi(t-p)}dt = \begin{cases} 1, & p = n \\ 0, & p \neq n \end{cases}$$

The formula (5) indicates a function of the fluency transform derived from the sample value, and represents an expansion form, in which the sampling value sequences is a expansion coefficient. On the other hand, the formula (6) indicates a function of the fluency inverse transform derived from the function of the fluency transform, and represents an operator, which obtains the sampling value sequences from the function of the fluency transform in the form of a integral transform. Note that, p is an arbitrary integer, and a bar expressed above "φ" in the formula (6) represents a conjugated complex of φ.

Further, in the fluency function space ${}^{m}S$, an orthogonal transform is derived from a fluency transform theorem. The orthogonal transform provide a generalization of a frequency concept in terms of agreement with Fourier transform at m=∞, and characterizes a harmonic structure. The theorem satisfies the following two formulae for an arbitrary function $f \in {}^{m}S$.

$$f(t) = (1/2\pi)\int_{-\pi}^{\pi}F(u)_{[^{m}O]}\phi(t,u)du \qquad (7)$$

$$F(u) = \int_{-\infty}^{\infty}f(t)\overline{{}_{[^{m}O]}\phi(t-u)}dt \qquad (8)$$

where $$_{[^{m}O]}\phi(t,u) = (1/2\pi)\int_{-\infty}^{\infty}\left\{\sum_{p=-\infty}^{\infty}\delta(\omega-u+2\pi p)\right\} \times \left\{\sum_{q=-\infty}^{\infty}(1-q(2\pi/\omega))^{-2m}\right\}^{-1/2} \times \exp(i\omega t)d\omega$$

Note that, φ(u) is a function of the fluency function space ${}^{m}S$ and is expressed by using a Dirac delta function δ. "u" is an arbitrary variable.

The formula (7) is designated as a fluency orthogonal transform, and the formula (8) is designated as a fluency inverse orthogonal transform.

The fluency orthogonal transform expressed by the formula (7) can transform discrete sample values to continuous function values. Accordingly, in this embodiment, the fluency orthogonal transform is utilized for expanding the original image data. Namely, the fluency transform is executed to each pixel of the original image data P, and then the expanded-image data J is generated on the basis of the continuous function values.

Herein, some concrete fluency functions are explained. The order "m" of the fluency function space ${}^{m}S$ can be expressed as a parameter "m" of the fluency function, and when the parameter "m" is set to "1,2, . . . " in order, the fluency function are represented as shown below.

The most simple function system in the fluency function is obtained by setting the function "$f(t) \in {}^{1}S$" in the formula (3) to the rectangular function, which is represented by "χ(t)" in the formula (2), in place of the staircase function, and setting the function $g \in {}^{1}S$ represented in the formula (4) to the above rectangular function "f(t)". Namely, the function f(t) represented in the formula (3) becomes a rectangular function by applying a Delta (δ) function to an input function of the formula (3) in place of the rectangular function expressed by the formula (2). Then, the rectangular function f(t) is utilized for a function of the convolution integral in place of the function g(τ) represented in the formula (4), when transforming the function space ${}^{m-1}S$ to the function space ${}^{m}S$.

Figure 3A:
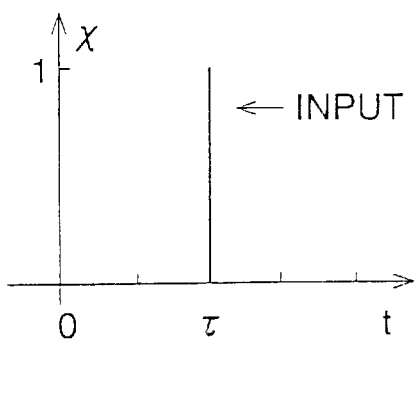
FIGS. 3A, 3B, 3C and 3D are view showing fluency functions varying with parameter m.

An input value at the formula (3) becomes the δ function shown in FIG. 3A in place of the rectangular function χ(t) represented in the formula (2). The value of the δ function is 1 when variable t is τ, and is 0 when variable t is not τ. The fluency function f(t) with the parameter m=1 is represented as following formula, in place of the formula (3).

$$f(t) = \sum_{n=-\infty}^{\infty}\chi_{n}\chi(t-n) = \begin{cases} 1, & \tau - 1/2 < t < \tau + 1/2 \\ 0, & \text{otherwise} \end{cases} \quad f(t) \in {}^{1}S \qquad (9)$$

Figure 3B:
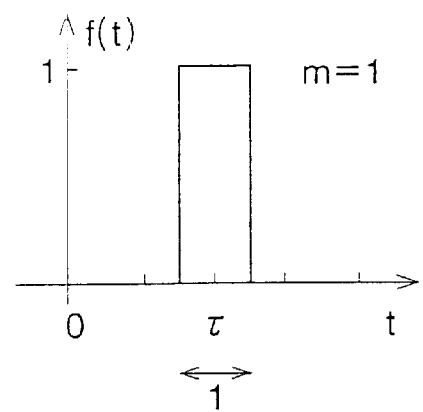

The fluency function f(t) in the formula (9) becomes a rectangular function, as shown in FIG. 3B. Then, the fluency function with the parameter m=2, denoted by "g(t)", is found by executing the convolution integral on the basis of the rectangular function f(t), as shown in the following formula.

$$g(t) = \int_{-\infty}^{\infty}f(t-\tau)f(\tau)d\tau \qquad (10)$$

$$= \begin{cases} t-\tau+1, & \tau-1 < t \leq \tau \\ -t+\tau+1, & \tau < t < \tau+1 \quad g(t) \in {}^{2}S \\ 0, & \text{otherwise} \end{cases}$$

Figure 3C:
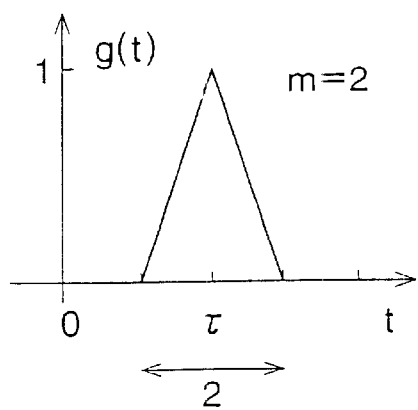

The fluency function g(t) obtained by the formula (10) is, as shown in FIG. 3C, a triangular function.

When the parameter m is 3, 4, 5 . . . , the convolution integral is executed, similarly to the parameter m=2. Namely, based on the fluency function at the parameter "m−1" and the function f(t) represented in the formula (9), the convolution integral is executed, so that the fluency function with the parameter m is generated. For example, when the parameter m is 3, based on the function g(t) obtained by the formula (10) and the function f(t) in the formula (9), the convolution integral is executed, so that a fluency function h(t) shown in FIG. 3D, which is smooth and expressed by a curve, is generated. The fluency function h(t) is expressed as $$h(t) = \int_{-\infty}^{\infty}g(t-\tau)f(\tau)d\tau \quad h(t) \in {}^{3}S \qquad (11)$$

-continued $$f(t) = \begin{cases} -\frac{1}{4}(t-\tau+2)^2, & \tau-2 < t < \tau-\frac{3}{2} \\ \frac{3}{4}(t-\tau+1)^2 + \frac{1}{2}(t-\tau+1), & \tau-\frac{3}{2} \le t < \tau-1 \\ \frac{5}{4}(t-\tau+1)^2 + \frac{1}{2}(t-\tau+1), & \tau-1 \le t < \tau-\frac{1}{2} \\ -\frac{7}{4}(t-\tau)^2 + 1, & \tau-\frac{1}{2} \le t < \tau+\frac{1}{2} \\ \frac{5}{4}(t-\tau-1)^2 - \frac{1}{2}(t-\tau-1), & \tau+\frac{1}{2} \le t < \tau+1 \\ \frac{3}{4}(t-\tau-1)^2 - \frac{1}{2}(t-\tau-1), & \tau+1 \le t < \tau+\frac{3}{2} \\ -\frac{1}{4}(t-\tau-2)^2, & \tau+\frac{3}{2} \le t < \tau+2 \\ 0, & \text{otherwise} \end{cases}$$

In this way, the fluency function varies with the parameter m. The fluency functions, shown in FIGS. 3B to 3D, correspond to sampling bases regarding the fluency function space $^mS$ respectively, which are disclosed in the Mathematical Physical Journal described above in this embodiment, the fluency transform (orthogonal transform) to the original image data P is executed on the basis of the fluency function in the case of the parameter m=1, 2 and 3.

Figure 4:
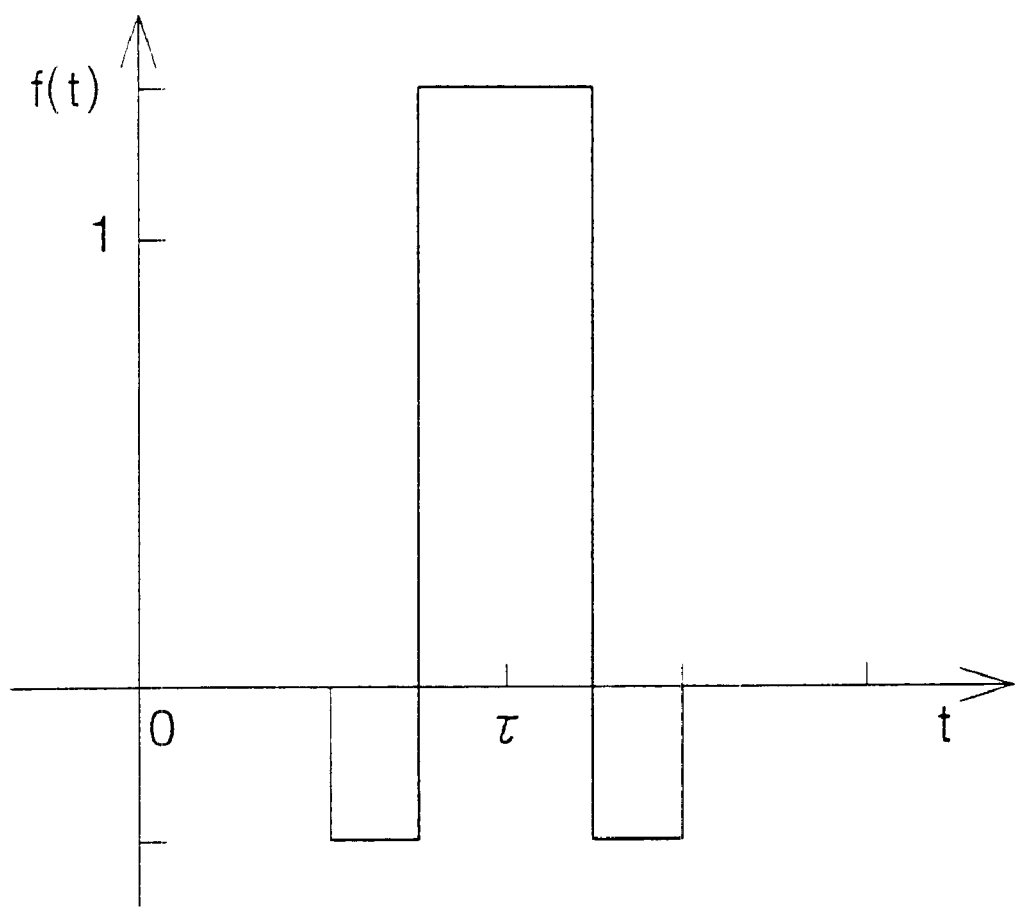
FIG. 4 is a normalized fluency function at the parameter m=1.

However, if the function f(t), obtained by the formula (9) and shown in FIG. 3B, is directly utilized at the convolution integral at the parameter m≥3, the value of the fluency function at t=τ does not coincide with 1. Accordingly, in this embodiment, normalized function shown in FIG. 4 is applied to the convolution integral in place of the function f(t) shown in FIG. 3B. The normalized function f(t) is normalized as for an area, which is formed based on the t-axis and the function f(t), such that the area of the function f(t) is always 1. For example, when the parameter m is 3, the normalized function f(t) is represented by $$f(t) = \begin{cases} -\frac{1}{3}, & \tau-1 < t \le \tau-\frac{1}{2} \\ \frac{4}{3}, & \tau-\frac{1}{2} < t \le \tau+\frac{1}{2} \\ -\frac{1}{3}, & \tau+\frac{1}{2} < t < \tau+1 \\ 0, & \text{otherwise} \end{cases} \quad (12)$$

Thus, the value of the fluency function is always 1 at t=τ.

Figure 5:
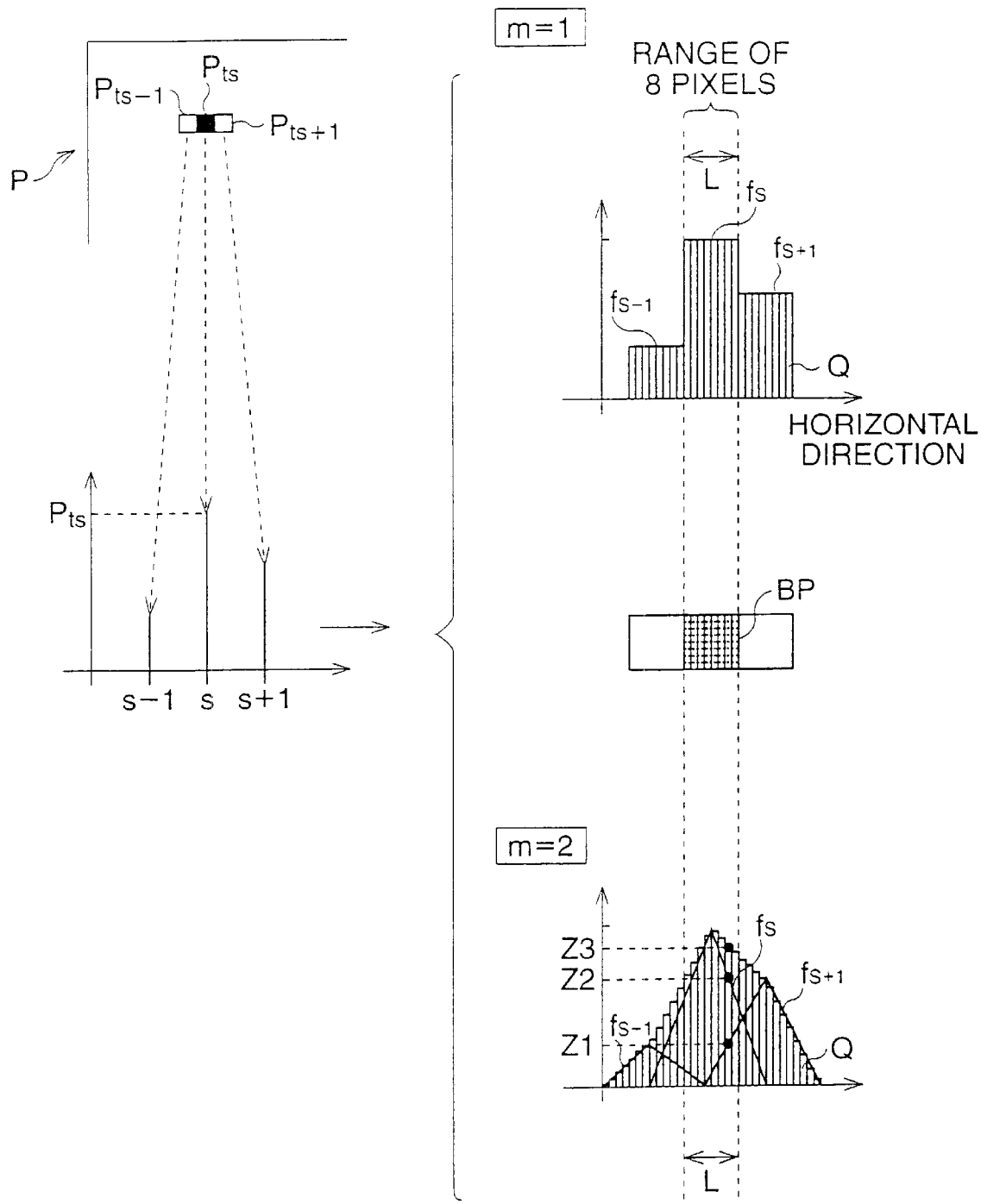
FIG. 5 is a view showing an interpolation processing by a fluency transform.

FIG. 5 is a view showing an interpolation processing by the fluency transform. Note that, for ease of explanation, the fluency transform is executed for only the horizontal direction, or x-axis. The magnification is "8".

Herein, as one example, three pixels $P_{ts-1}$, $P_{ts}$, $P_{ts+1}$, adjoining each other in the original image data P, are subjected to the fluency transform by the formula (7) along the horizontal direction. Each pixel value of the three pixels $P_{ts-1}$, $P_{ts}$, $P_{ts+1}$ is different respectively. The input function F(u) at the formula (7) corresponds to each pixel value of the three pixels $P_{ts-1}$, $P_{ts}$, $P_{ts+1}$.

When the input function F(u) at the formula (7) is a discrete value corresponding to δ function, the output function f(t) in the formula (7) corresponds to the fluency functions shown in FIGS. 3A to 3D. Therefore, by the fluency orthogonal transform, the output function f(t) having continuous values is generated. When the parameter m=1, an output function $f_s$, obtained by executing the fluency transform to the pixel value $P_{ts}$, is a rectangular function, as shown in FIG. 5. Each pixel value of 8 pixels along the horizontal direction (x-axis) in the block BP, represented by a bar "Q", is equal.

Then, when the parameter m is 1, the range of the output function $f_s$ along the x-axis corresponds to the range of the horizontal direction of the block BP (represented by "L" in FIG. 5). The range of the output functions $f_{s-1}$, $f_{s+1}$, obtained by executing the fluency transform to the pixel values $P_{ts-1}$, $P_{ts+1}$, does not overlap the range of the output function $f_s$.

On the other hand, when the parameter m is 2, each of the functions $f_{s-1}$, $f_s$, $f_{s+1}$, obtained by the formula (7) and corresponding to the pixel value $P_{ts-1}$, $P_{ts}$, $P_{ts+1}$ respectively, is a triangular function. In the case of the parameter m=2, each range of functions $f_{s-1}$, $f_s$, $f_{s+1}$ overlaps each other as the range L of the block BP is defined in accordance with the parameter m=1. The difference between the range of the function f(t) at the parameter m=2 and that of the function f(t) at the parameter m=2 is shown in FIGS. 3B and 3C.

Accordingly, each pixel value, represented by the bar Q, is obtained by adding each value of the functions $f_{s-1}$, $f_s$, $f_{s+1}$. Namely, each value of the functions $f_{s-1}$, $f_s$, $f_{s+1}$, corresponding to each position of 8 pixels in the horizontal direction of the block BP, is added, so that each pixel value of 8 pixels along the horizontal direction (x-axis) is obtained. For example, regarding the second pixel from the right end in the block BP, the pixel value Z3 is obtained by adding the pixel value Z2, which is the value of the function $f_s$, and the pixel value Z1, which is the value of the function $f_{s+1}$.

Figure 3D:
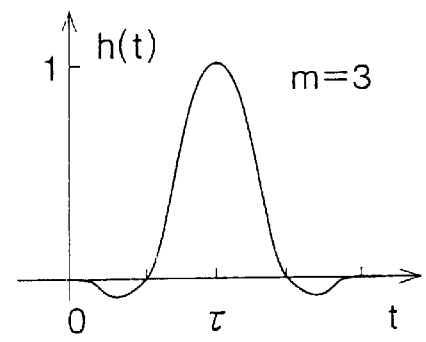

As the parameter "m" becomes large, the range of the function f(t) along the horizontal direction becomes larger, as shown in FIG. 3D. In this case, each pixel value of the block BP, corresponding to the pixel $P_{ts}$ is calculated on the basis of the pixel value $P_{ts-1}$, $P_{ts+1}$, and other adjacent pixels in the original image data P.

After the fluency transform along the horizontal direction is executed, the fluency transform along the vertical direction (y-axis) is executed to the block BP, so that the block B0 composed of 8×8 pixels is generated. Namely, when executing the fluency transform along the x-axis and the y-axis for each pixel of the original image data P in order, the expanded-image data J is generated. Each pixel value of the expanded-image data J depends upon the parameter m.

With reference to FIGS. 6 to 9, a generation process of the expanded-image data J by the fluency transform is explained. Herein, the parameter m is one of 1 to 3, and adjacent pixels to the pixel $P_{ts}$, necessary for finding each pixel of the block BP, are represented by $P_{ts+2}$, $P_{ts-1}$, $P_{ts+1}$, $P_{ts+2}$, $P_{t-2s}$, $P_{t-1s}$, $P_{t+1s}$, $P_{t+2s}$. Note that, values of the pixels $P_{ts-2}$, $P_{ts-1}$, $P_{ts+1}$, $P_{ts+2}$, $P_{t-2s}$, $P_{t-1s}$, $P_{t+1s}$, $P_{t+2s}$ are also expressed by "$P_{ts-2}$, $P_{ts-1}$, $P_{ts+1}$, $P_{ts+2}$, $P_{t-2s}$, $P_{t-1s}$, $P_{t+1s}$, $P_{t+2s}$".

Figure 6:
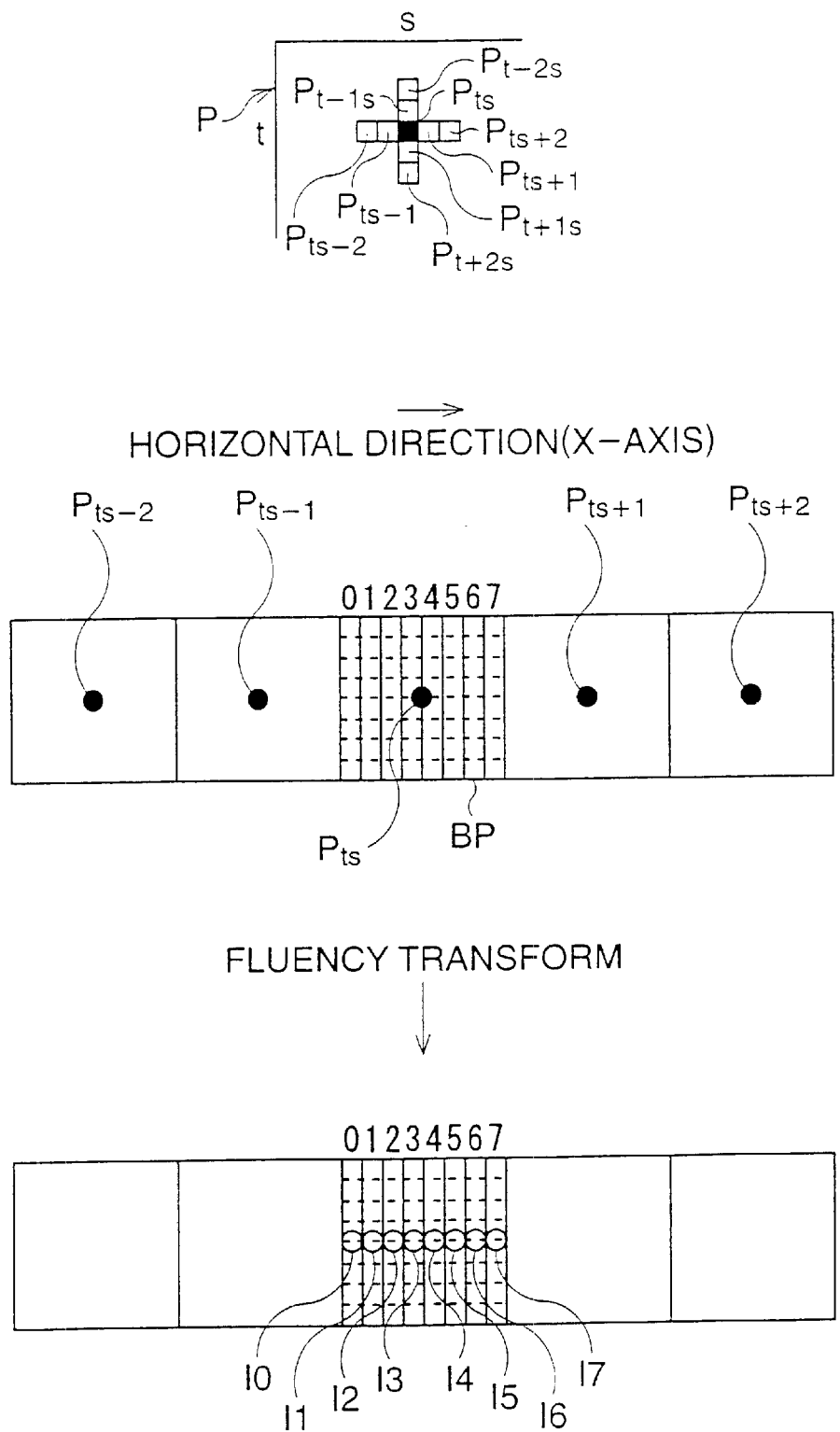
FIG. 6 is a view showing the fluency transform along a horizontal direction.

FIG. 6 is a view showing the fluency transform along the horizontal direction (x-axis). The positions of 8 pixels in the block BP are expressed by "0, 1, 2 . . . 7" in order.

Firstly, the pixel $P_{ts}$ is arranged at the center of the generated block BP (between third position and fourth position), and then the fluency transform at the parameter m (=1, 2 or 3) is executed along the horizontal direction (x-axis). Similarly to the pixel $P_{ts}$, the pixels $P_{ts-2}$, $P_{ts-1}$, $P_{ts+1}$, $P_{ts+2}$, $P_{t-2s}$, $P_{t-1s}$, $P_{t+1s}$, $P_{t+2s}$ are subject to the fluency transform in the horizontal direction, at the center of each block generated by the fluency transform. 8 pixels, represented by "I0, I1, I2, I3, I4, I5, I6, I7" in FIG. 6, are based on the pixels $P_{ts-2}$, $P_{ts-1}$, $P_{ts}$, $P_{ts+1}$, $P_{ts+2}$.

FIG. 7 is a view showing a table T1 indicating 8 pixel values along the horizontal direction in the block BP, obtained by the fluency transform. In the table T1, pixel values corresponding to the parameter 1, 2 and 3 respectively, are shown, and each pixel value is obtained on the basis of the formula (7). Herein, pixel values along horizontal direction are also represented by "I0, I1, I2, . . . I7", which are identical to the 8 pixels along the horizontal direction.

For example, when the parameter m is 1, all of the pixel values I0 to I7 coincide with the pixel value $P_{ts}$. As described above using FIG. 5, the pixel values $P_{ts-2}$, $P_{ts-1}$, $P_{ts+1}$, $P_{ts+2}$ except for the pixel value $P_{ts}$ in the original image data P do not effect generation of the pixel values to I7 when the parameter m=1. On the other hand, when the parameter m is 2, as shown in FIG. 7, the pixel values I0 to I7 are generated on the basis of the pixel values $P_{ts-1}$, $P_{ts}$, $P_{ts+1}$ and the addition of the value of the function $f_{s-1}$, $f_s$, $f_{s+1}$ at the formula (7). Namely, the pixel values I0 to I7 are respectively generated by adding each value of the functions $f_{s-1}$, $f_s$, $f_{s+1}$, which corresponds to the pixel position, as shown in FIG. 5. When the parameter m is 3, the pixel values I0 to I7 are obtained on the basis of the pixel values $P_{ts-2}$, $P_{ts-1}$, $P_{ts}$, $P_{ts+1}$, $P_{ts+2}$. After the fluency transform in the horizontal direction is executed, secondly, the fluency transform in the vertical direction (y-axis) is executed to the block BP composed of 8 pixels I0 to I7.

Figure 8:
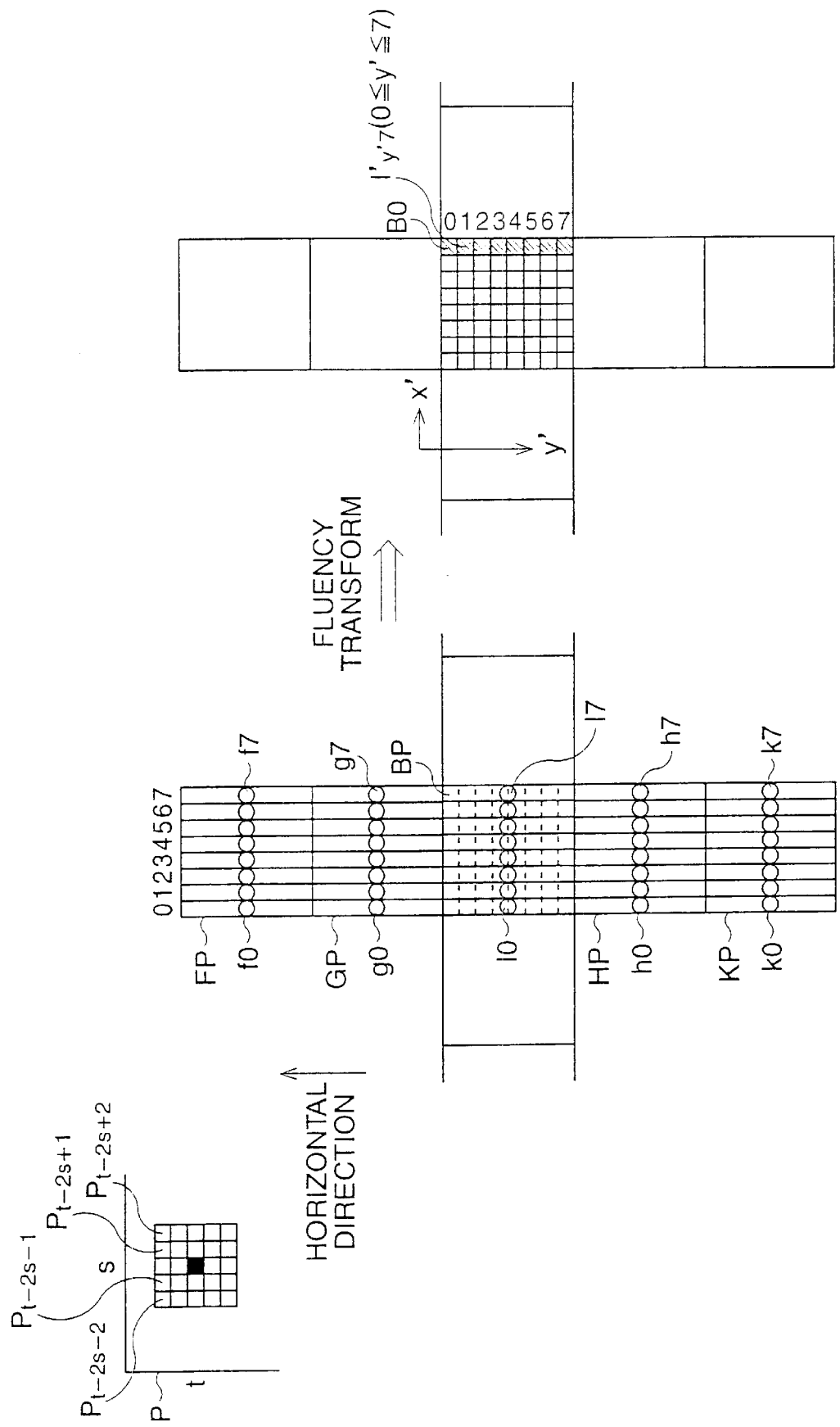
FIG. 8 is a view showing the fluency transform along a vertical direction.

FIG. 8 is a view showing the fluency transform along the vertical direction. Similarly to the horizontal direction, the positions of 8 pixels along the vertical direction are expressed by "0, 1, 2, . . . 7" in order.

When the fluency transform along the horizontal direction is executed to each pixel of the original image data P, blocks FP, GP, HP, KP, corresponding to the pixels $P_{t-2s}$, $P_{t-1s}$, $P_{t+1s}$, $P_{t+2s}$ respectively, are obtained. Each pixel of the blocks FP, GP, HP, KP is designated by "f0, f1, . . . f7", "g0, g1, . . . g7", "h0, h1, . . . h7", "k0, k1, . . . k7", respectively. Note that, Each pixel of the blocks FP, GP, HP, KP is obtained on the basis of other adjacent pixels in the original image data P in addition to $P_{ts-2}$, $P_{ts-1}$, $P_{ts}$, $P_{ts+1}$, $P_{ts+2}$. For example, "f0, f1, . . . f7" of the block FP is obtained by "$P_{t-2s-2}$, $P_{t-2s-1}$, $P_{t-2s+1}$, $P_{t-2s+2}$.

The 8 pixels "I0, I1, I2, . . . I7" are subjected to the fluency transform along the vertical direction at the center of the block BP (between the third position and the fourth position), on the basis of the formula (7) The other pixels "f0, f1, . . . f7", "g0, g1, . . . g7", "h0, h1, . . . h7", "k0, k1, . . . k7" are also subjected to the fluency transform along the vertical direction respectively, similarly to the 8 pixels I0 to I7. Then, 8×8 pixels of the block B0 are obtained by adding each value of the output values f(t) (at the formula (7)) based on the pixels "f0, f1, . . . f7" corresponding to the pixel positions "0, 1, 2, . . . 7", the output functions f(t) based on the pixels "g0, g1, . . . g7" corresponding to the pixel positions "0, 1, 2, . . . 7", the output values f(t) based on the pixels "I0, I1, . . . I7" corresponding to the pixel positions "0, 1, 2, . . . 7", the output values f(t) based on the pixels "h0, h1, . . . h7" corresponding to the pixel positions "0, 1, 2, . . . 7" and the output values f(t) based on the pixels "k0, k1, . . . k7" corresponding to the pixel positions "0, 1, 2, . . . 7". Herein, the pixel value of the block B0 is denoted by $I'_{y'x'}$ ($0 \leq x' \leq 7$, $0 \leq y' \leq 7$).

FIG. 9 is a view showing a table T2 representing 8 pixel values $I'_{y'7}$ ($0 \leq y \leq 7$), shown by diagonal line in FIG. 8. When the parameter m is 1, all of the pixel values $I'_{y77}$ are I7, when the parameter m is 2, the pixel values $I'_{y7}$ are obtained on the basis of the pixel values I7, g7, h7. When the parameter m is 3, the pixel values $I'_{y7}$ are obtained on the basis of the pixel values f7, g7, I7, h7, k7. Other pixels $I_{y'x'}$ ($0 \leq x' \leq 6$, $0 \leq y' \leq 7$) are also obtained on the basis of the pixels fx', gx', Ix', hx', kx' (x'=0 to 6). In this case, the pixel values $I_{y'x'}$ ($0 \leq x' 6$, $0 \leq y \leq 7$) are obtained by substituting fx', gx', Ix', hx', kx' (x'=0 to 6) for f7, g7, I7, h7, k7 represented in FIG. 9.

In this way, the block B0 corresponding to the pixel $P_{ts}$ in the original image data P is generated by executing the fluency transform along the horizontal and the vertical direction. The fluency transform is executed for each pixel of the original image data P at the same time, so that the blocks B including the block B0 is generated, namely, the expanded-image data J is obtained. Note that, the range of the parameter m is not restricted 1 to 3, and may be set to an arbitrary range (for example, 1 to 5). In this embodiment, the parameter m is more than 2 so as to make the variation of pixel values smooth.

Figure 10:
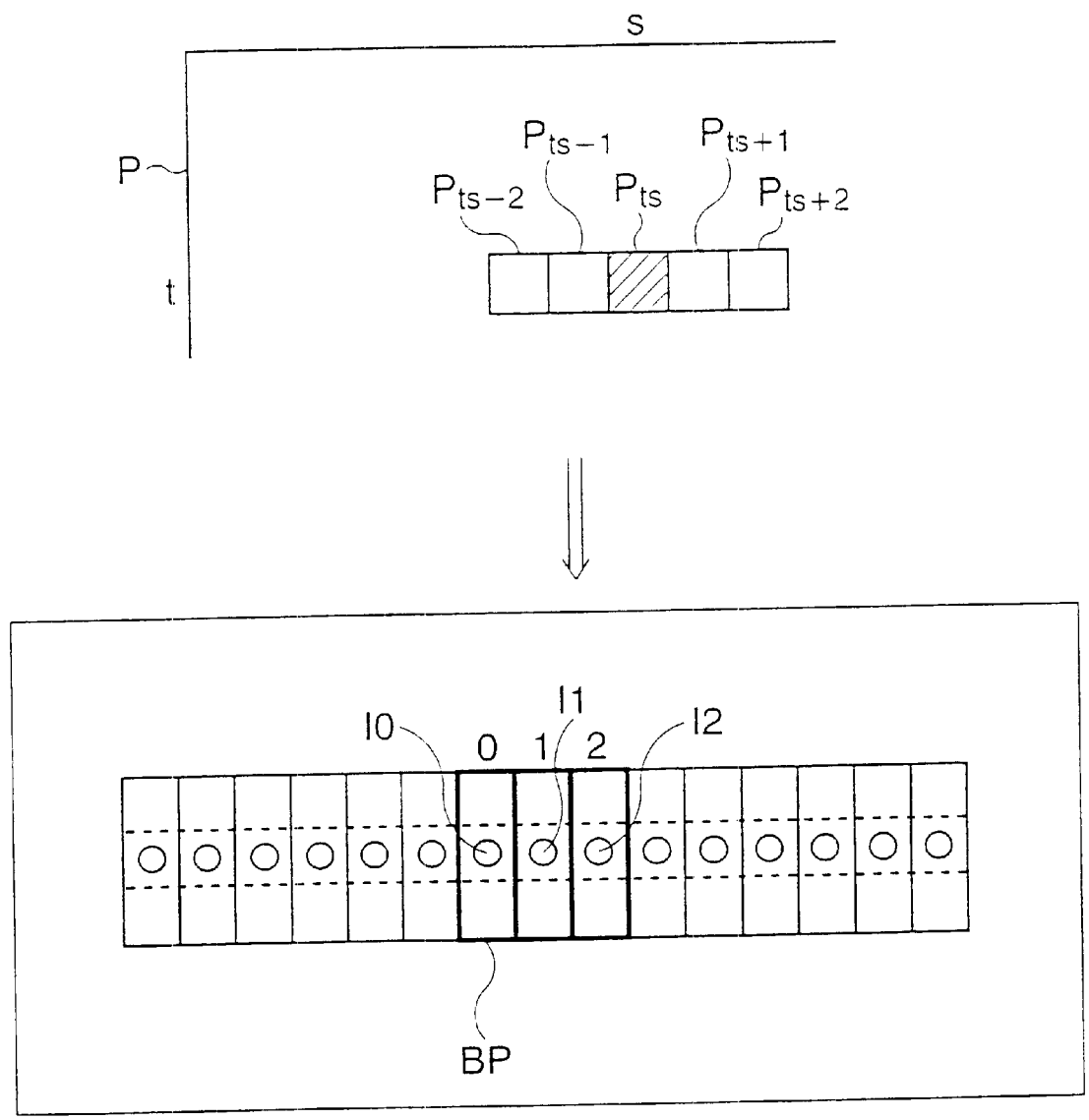
FIG. 10 is a view showing the fluency transform along the horizontal direction in the case in which the magnifying power is odd number.
Figure 12:
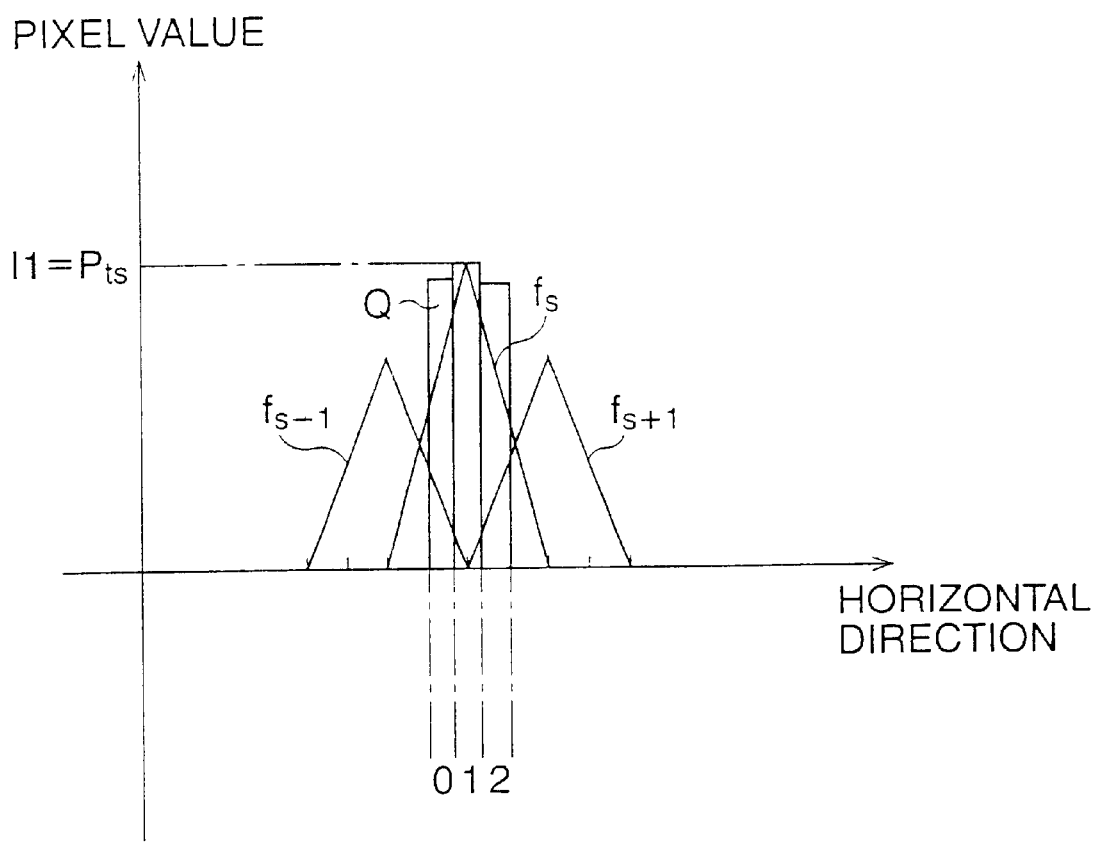
FIG. 12 is a view showing pixel values along the horizontal direction in the block.

With reference to FIGS. 10 to 16, the shift processing is explained below. In FIGS. 10 to 12, the fluency transform without the shift processing in a case in which the magnifying power is odd numbered is shown, and in FIGS. 13 to 16, the fluency transform with the shift processing is shown.

FIG. 10 is a view showing the fluency transform along the horizontal direction. Note that, the magnifying power along the horizontal (or vertical) direction is 3. When the fluency transform is executed, as described above, each pixel $P_{yx}$ in the original image data P is positioned at the center of the corresponding block. Therefore, when the magnifying power is 3 times, the pixel $P_{ts}$ is arranged at the pixel position "1" along the horizontal direction. Similarly, the other pixels $P_{t-2s}$, $P_{t-1s}$, $P_{ts+1}$, $P_{ts+2}$ are arranged at the center of the corresponding block.

FIG. 11 is a view showing a table T3 indicating 3 pixel values along the horizontal direction. As shown in the table T3, even when the parameter m=2 and 3, the pixel values $P_{ts}$ directly become the pixel value I1. This is because, regarding the functions f(t) (at the formula (7)) based on the pixel $P_{ts-2}$, $P_{ts-1}$, $P_{ts+1}$, $P_{ts+2}$, a value corresponding to the pixel position "1" in the block BP, are all "0". Other pixel values $P_{ts-2}$, $P_{ts-1}$, $P_{ts+1}$, $P_{ts+2}$ also become pixel values at the center of the corresponding block respectively, similarly to the pixel $P_{ts}$. In FIG. 12, the pixel values along the horizontal direction, based on the parameter m=2, are shown with the function $f_{s-1}$, $f_s$, $f_{s+1}$, obtained by the formula (7).

Figure 13:
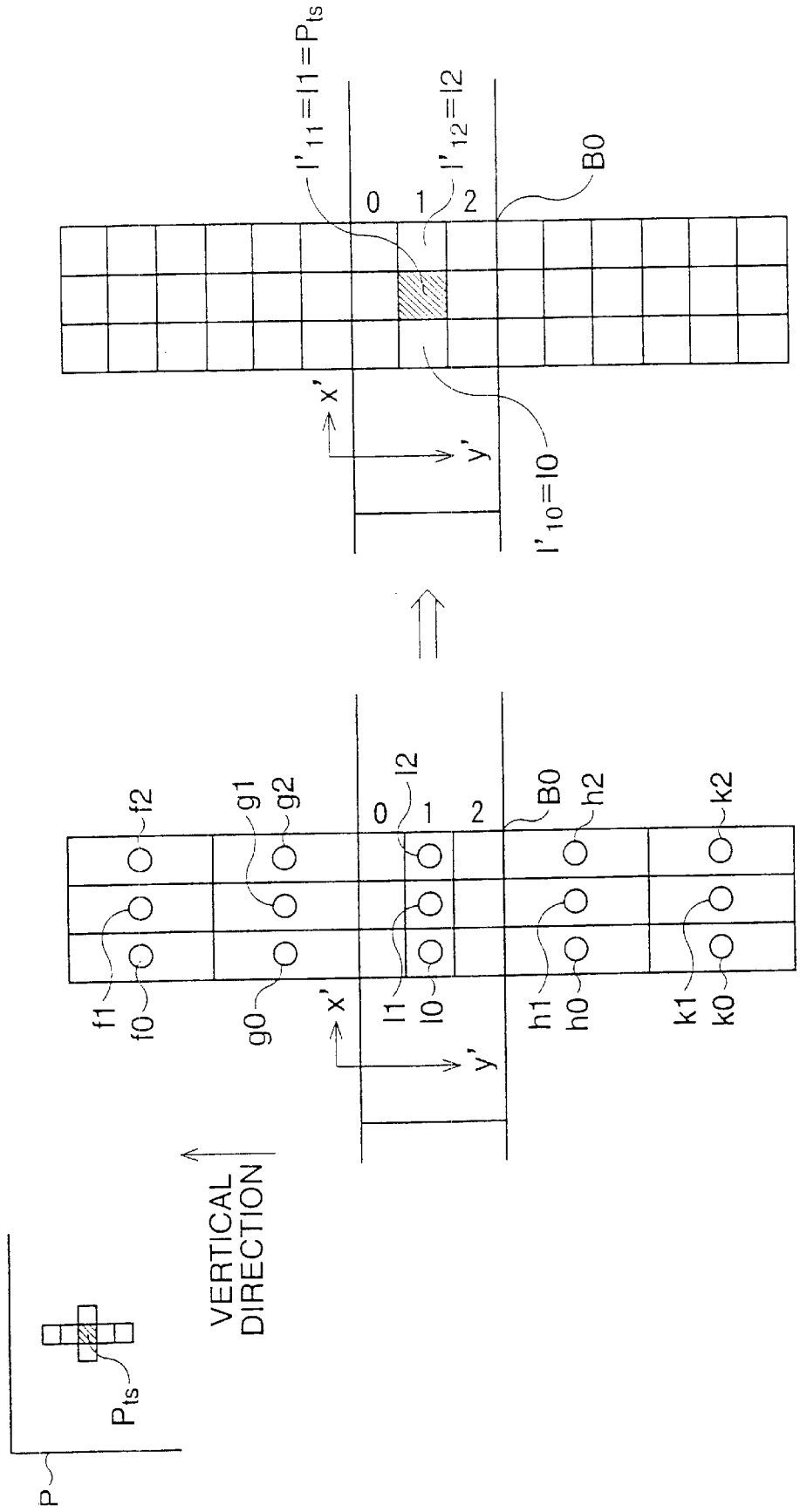
FIG. 13 is a view showing 3×3 pixel values including an unchanging pixel value in the block

FIG. 13 is a view showing the fluency transform along the vertical direction. As shown in FIG. 13, the block B0 is generated by executing the fluency transform along the vertical direction. The pixel value $I'_{11}$ is equal to the pixel value I1, or the pixel value $P_{ts}$. Then, the pixel values $I'_{10}$, $I'_{12}$ become equal to the pixel value I0, I2 respectively.

In this way, when the fluency transform is executed in a state in which the magnifying power is odd numbered, each pixel value $P_{yx}$ in the original image data P becomes equal to the pixel value at the center of corresponding block B. Consequently, the pixel values equal to the pixel values $P_{yx}$ exist in the expanded-image data J. Herein, the above pixel values are represented as "unchanging pixel vales". It is due to a characteristic of the fluency transform, in other words, the fluency function shown in FIGS. 3A to 3D that unchanging pixel values occur.

Incidentally, the expandad-image data J is generated by interpolating pixels between pixels in the original image data P Accordingly, as a variation of the pixel value between pixels is smaller, namely, the pixel values vary smoothly between adjacent pixels, picture quality in the expanded-image data J is less degraded However, when the unchanging pixel value exists in the expanded-image data J, the variation of the pixel value is not as smooth as compared with that of the expanded-image data J in which no unchanging pixel value exists. For example, the variation among the pixels I0, I1 and I2, shown in the table T2 in FIG. 11, is not as smooth compared with the variation of the pixel value among the pixels, I2, I3, I4 and I5 shown in the table T1 in FIG. 7.

Further, regarding the vertical direction, a similar problem occurs. For example, the pixel value I'$_{10}$ becomes equal to the pixel value I0, so that the variation of the pixel values along the vertical direction is not as smooth similarly to the horizontal direction.

In this way, picture quality in the expanded-image data J in a case where the magnifying power is odd numbered decreases in comparison with the expanded image data J in the case where the magnifying power is even numbered. Accordingly, in this embodiment, position-relationship between the pixel-position of each block B and each corresponding pixel P$_{yx}$ of the original image data P is changed, so as not to generate the unchanging pixel values, when the magnifying power is odd numbered.

Figure 14:
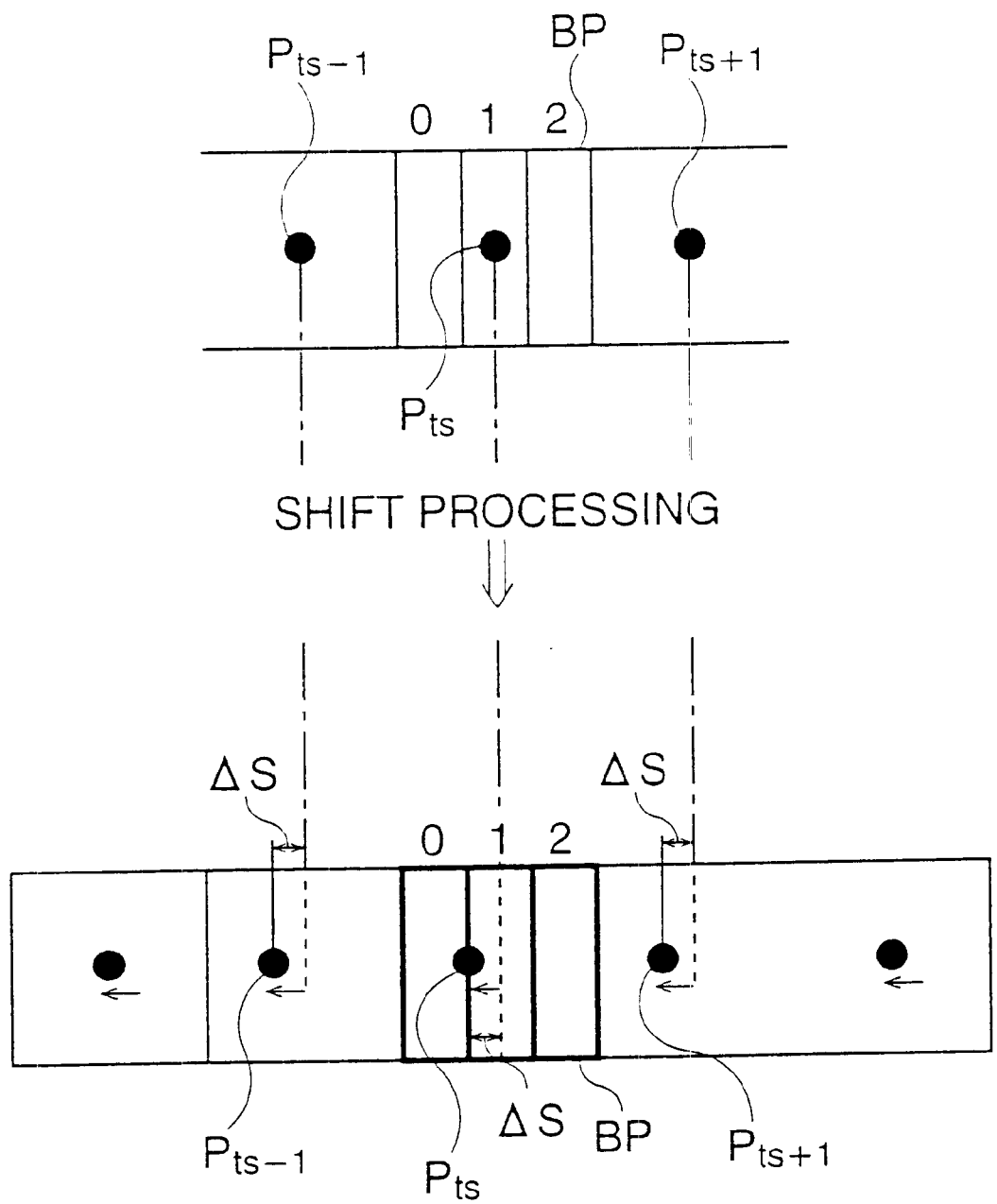
FIG. 14 is a view showing a shift processing along the horizontal direction.

FIG. 14 is a view showing the shift processing along the horizontal direction.

When the magnifying power is odd numbered, the position of each pixel P$_{yx}$ in the original image data P is relatively shifted from the center position of the corresponding block by a shifting-amount ΔS along the horizontal and left direction, such that each pixel P$_{yx}$ are arranged between the first pixel position and the second pixel position In the block BP. For example, the pixel P$_{ts}$ is relatively shifted from the center position of the block to a position between a pixel position "0" and a pixel position "1". When it is supposed that a magnitude of width/length of the each block B is "M", the shifting-amount ΔS is "M/6".

FIG. 15 is a view showing a table T4 indicating 3 pixel values along the horizontal direction "I0, I1 and I2". The 3 pixel values are obtained by applying the fluency transform along the horizontal direction after the shift processing along the horizontal direction is executed. As can be seen in table T4, in comparison with the table T3 in FIG. 11, no unchanging pixel values (=P$_{ts}$) exist when the shift processing is executed. This is because, regarding the functions f(t) (at the formula (7)) based on the pixel P$_{ts-2}$, P$_{ts-1}$, P$_{ts+1}$, P$_{ts+2}$, a value of "0" in the block BP, is relatively shifted to between the pixel position "0" and the pixel position "1".

Figure 16:
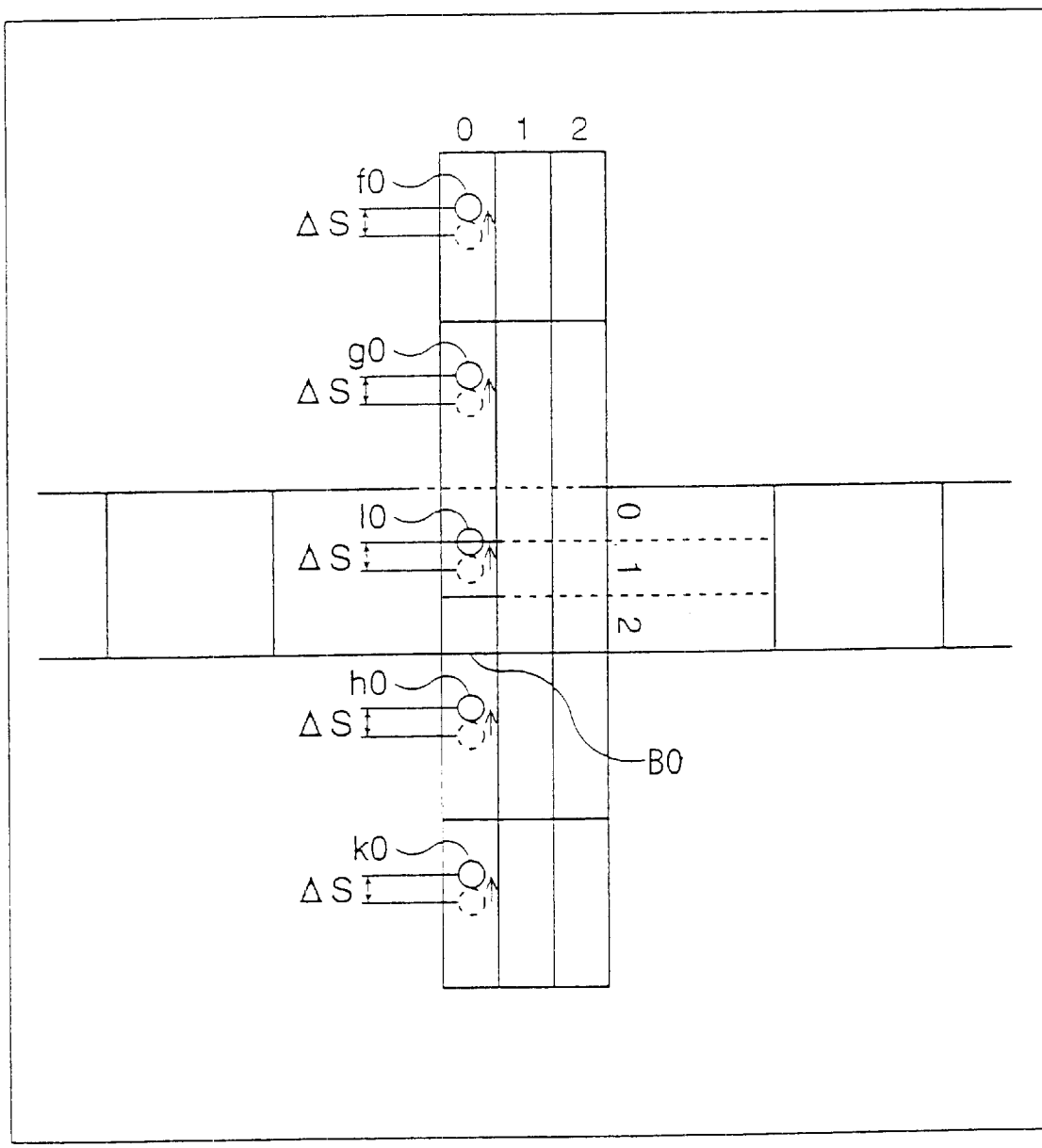
FIG. 16 is a view showing a shift processing along the vertical direction.

FIG. 16 is view showing a shift processing executed at the fluency transform along the vertical direction. Note that, only pixels f0, g0, I0, h0, k0, positioned at "0" along the horizontal direction, are shown for explanation of the shift processing.

When the fluency transform along the vertical direction is executed, the pixels, generated by the fluency transform along the horizontal direction, are relatively shifted along the vertical and upper direction by the shifting-amount "Δs". As the block is the square block, the shifting amount "ΔS" is "M/6". For example, the pixel I0 is relatively shifted from the pixel position "1" to a position between the pixel-position "0" and the pixel-position "1".

In this way, as the shift processing along the horizontal direction by "1/2M" is executed before the fluency transform along the horizontal direction, using the formula (7), and the shift processing along the vertical direction by "1/2M" is executed before the fluency transform along the vertical direction using the formula (7), no unchanging pixel values exist in the expanded-image data J, so that the variation of the pixel value becomes smooth.

Note that, in FIGS. 14 to 16, for ease of explanation, each pixel P$_{yx}$ is relatively shifted with respect to each corresponding pixel-position of each block B in the generated expanded-image data J. In fact, when the shift processing is executed by the shifting processor 12, the pixel-positions of the generated expanded-image data J are relatively shifted with respect to each corresponding pixel P$_{yx}$ in place of shifting each pixel P$_{yx}$. To be precise, when the fluency transform along the horizontal direction shown in FIG. 14 is executed, the pixel-positions "0 to 2" along the horizontal direction in the block BP are relatively shifted along the horizontal and right direction such that the pixel P$_{ts}$ is between the pixel-position "0" and the pixel-position "1". Other blocks are similar to the block BP. Then, when the fluency transform along the vertical direction shown in FIG. 16 is executed, the pixel-positions "0 to 2" along the vertical direction in the block B0 are relatively shifted along the vertical and lower direction such that each of the pixels I0 to I3 is between the pixel-position "0" and the pixel-position "1". Other blocks are similar to the block B0. Hereinafter, the pixel-positions are represented by "pixel generating positions".

FIG. 17 is a view showing a flowchart of the expansion processing. The size of the expanded-image data J is $Z^2$ times of the original image data P. Note that, herein the magnifying power is represented by "Z".

In Step 101, each pixel P$_{yx}$ is arranged at a position corresponding to the center position of each block. In Step 102, it is determined whether the magnifying power Z set in advance is odd numbered.

When it is determined that the magnifying power Z is odd numbered at Step 102, the process goes to Step 103. In Step 103, each pixel P$_{yx}$ in the original image data P is shifted along the horizontal and left direction by the shifting-amount "ΔS". In other words, the pixel generating positions are relatively shifted along the horizontal and right direction with respect to each corresponding pixel P$_{yx}$. As the magnitude of the width/length of each block B in the expanded-image data J is represented by "M" as described above, the shifting-amount ΔS becomes "M/2Z". After the shirt processing along the horizontal direction is executed, the process goes to Step 104.

In Step 104, the fluency transform along the horizontal direction is executed to each shifted pixel P$_{yx}$, so that pixels along the horizontal direction, a number of which is Z times of "A", is generated. After Step 104 is executed, the process goes to Step 105.

In Step 105, the pixels generated by the fluency transform along the horizontal direction are relatively shifted along the vertical and upper direction by the shifting-amount "ΔS (=M/2Z)". In other words, the pixel generating positions are relatively shifted along the vertical and lower direction with respect to corresponding pixels, generated by the fluency transform along the horizontal direction Then, in Step 106, the fluency transform along the vertical direction is executed, so that the expanded-image data J is generated.

On the other hand, when it is determined that the magnifying power is not odd numbered, namely, is even numbered, the process goes to Step 107. The process in Step 107 is similar to the process in Step 103, and the process in Step 108 is similar to the process in Step 105. Namely, the fluency transform along the horizontal and vertical direction is directly executed to each pixel in the original image data P, so that the expanded-image data J is generated. After Step 108 is executed, the expanded-image generating process is terminated.

In this way, in this embodiment, the expanded-image data J is obtained by applying the fluency transform to the original image data P. Consequently, the variation of the pixel values between each pixel in the expanded-image data J becomes smooth, namely, the picture quality can be maintained in the process of expansion processing.

When the magnifying power is odd numbered, firstly, the pixel generating positions along the horizontal direction, corresponding to the pixel-position of the generated expanded-image data J, is relatively shifted along the horizontal direction by the shifting-amount "ΔS (=M/2Z)" at the fluency transform along the horizontal direction. Then, the pixel generating positions along the vertical direction are relatively shifted along the vertical direction by the shifting-amount "ΔS (=M/2Z)" with respect to each of the pixels aligned along the horizontal direction, obtained by the fluency transform along the horizontal direction. Thus, no unchanging pixel values exist in the expanded-image data J, the variation of pixel values between each pixel becomes smooth even when the magnifying power is odd numbered.

Note that, the fluency transform may be executed along the vertical direction and along the horizontal direction in order. Further, the original image data P may be expanded only along the horizontal (width) direction or the vertical (length) direction. In this case, the pixel generating positions along the horizontal direction or the vertical direction are shifted relative to each corresponding pixel $P_{yx}$ such that each pixel $P_{yx}$ is off-center of each corresponding block of the generated expanded-image data J.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No.11-235960 (filed on Aug. 23, 1999) which is expressly incorporated herein, by reference, in its entirety.

What is claimed is:

1. An apparatus for expanding original image data, in which a plurality of pixels is arranged in a matrix, so as to obtain expanded-image data partitioned into a plurality of blocks, each of which is composed of a plurality of pixels, said apparatus comprising:

a magnifying power setting processor that sets a magnifying power regarding at least one of a first direction along a width and a second direction along a length in said original image data;

a pixel arranger that arranges each pixel in said original image data at a position corresponding to a center position of each of said plurality of blocks in accordance with said magnifying power;

an expanded-image generating processor that generates said expanded-image data corresponding to said magnifying power by applying a fluency transform to each arranged pixel in said original image data, said plurality of pixels in each block being generated at pixel generating positions;

a magnifying power inspector that inspects whether said magnifying power is odd numbered; and a shifting processor that shifts said pixel generating positions relative to each corresponding pixel of said original image data by a shifting-amount corresponding to said magnifying power such that each arranged pixel of said original image data is off-center with respect to said plurality of blocks, when said magnifying power is the odd numbered.

2. The apparatus according to claim 1, wherein said expanded-image generating processor applies said fluency transform, which is expressed by the following formula, to each pixel in said original image data:

$$f(t) = (1/2\pi) \int_{-\pi}^{\pi} F(u)_{[m_O]}\phi(t,u)\,du$$

note that, $$_{[m_O]}\phi(t,u) = (1/2\pi)\int_{-\infty}^{\infty} \left\{ \sum_{p=-\infty}^{\infty} \delta(\omega - u + 2\pi p) \right\} \times$$

$$\left\{ \sum_{q=-\infty}^{\infty} (1 - q(2\pi/\omega))^{-2m} \right\}^{-1/2} \times \exp(i\omega t)\,d\omega$$

where F(u) corresponds to each pixel value of said original image data, f(t) is output values of said fluency transform, $\phi$(t,u) is a fluency function defined by a fluency function space $^mS$, m (=1,2,3, ... ) is a parameter indicating a differentiability.

3. The apparatus according to claim 2, wherein said expanded-image generating processor obtains said expanded-image data by adding said output values f(t) corresponding to pixel position in each of said plurality of blocks.

4. The apparatus according to claim 3, wherein said expanded-image generating processor applies said fluency transform along said first direction so that pixels aligned along said first direction are generated, and then applies said fluency transform along said second direction to said pixels aligned along said first direction.

5. The apparatus according to claim 4, wherein said shifting processor shifts said pixel generating positions along said first direction such that each arranged pixel of said original image data is between each corresponding pixel generating position and its adjacent pixel generating position when executing said fluency transform along said first direction, and shifts said pixel generating positions along said second direction such that each of said pixels aligned along said first direction is between each corresponding pixel generating position and its adjacent pixel generating position along said second direction when executing said fluency transform along said second direction.

6. The apparatus according to claim 4, wherein a pixel number along said width direction and a pixel number along said length direction in each of said plurality of blocks is the same, and said magnifying power indicates a ratio of a pixel number along said first/second direction in said expanded-image data to a pixel number along said first/second direction in said original image data.

7. The apparatus according to claim 6, wherein said shifting processor shifts by "M/2Z" along said first and second direction respectively when it is supposed that a length/width of each block is represented by "M" , and said magnifying power is represented by "Z".

8. A method for expanding original image data, in which a plurality of pixels is arranged in a matrix, so as to obtain expanded-image data partitioned into a plurality of blocks, each of which is composed of a plurality of pixels, said method comprising:

a first step that sets a magnifying power regarding at least one of a first direction along a width and a second direction along a length in said original image data;

a second step that arranges each pixel in said original image data at a position corresponding to a center position of each of said plurality of blocks in accordance with said magnifying power;

a third step that inspects whether said magnifying power is odd numbered;

a fourth step that shifts pixel generating positions relative to each corresponding pixel of said original image data by a shifting-amount corresponding to said magnifying power such that each arranged pixel of said original image data is off-center with respect to said plurality of blocks, when said magnifying power is the odd numbered; and a fifth step that generates said expanded-image data corresponding to said magnifying power by applying a fluency transform to each pixel in said original image data, each pixel in said original image data being subjected to said fluency transform at one of the position corresponding to said center position of each block and an off-center position with respect to each block.

9. A memory medium that stores a program for expanding original image data comprising:

a first step that sets a magnifying power regarding at least one of a direction along a width and a direction along length in said original image data;

a second step that arranges each pixel in said original image data at a position corresponding to a center position of each of said plurality of blocks in accordance with said magnifying power;

a third step that inspects whether said magnifying power is odd numbered;

a fourth step that shifts pixel generating positions relative to each corresponding pixel of said original image data by a shifting-amount corresponding to said magnifying power, such that each arranged pixel of said original image data is off-center with respect to said plurality of blocks, when said magnifying power is the odd numbered; and a fifth step that generates said expanded-image data corresponding to said magnifying power by applying a fluency transform to each pixel in said original image data, each pixel in said original image data being subjected to said fluency transform at one of the position corresponding to said center position of each block and an off-center position with respect to each block.

\* \* \* \* \*